(12) United States Patent
Mello

(10) Patent No.: US 9,668,409 B2
(45) Date of Patent: Jun. 6, 2017

(54) CUTTING SYSTEM FOR A HARVESTER AND A SUGAR CANE HARVESTER HAVING A CUTTING SYSTEM

(75) Inventor: Maurilio O. Mello, Ribeirão Preto (BR)

(73) Assignee: CNH Industrial Latin America LTDA, Contagem/Minas Gerais (BR)

( * ) Notice: Subject to any disclaimer, the term of this patent is extended or adjusted under 35 U.S.C. 154(b) by 0 days.

(21) Appl. No.: 14/391,633

(22) PCT Filed: Apr. 9, 2012

(86) PCT No.: PCT/BR2012/000097
§ 371 (c)(1),
(2), (4) Date: Mar. 16, 2015

(87) PCT Pub. No.: WO2013/152405
PCT Pub. Date: Oct. 17, 2013

(65) Prior Publication Data
US 2015/0296708 A1    Oct. 22, 2015

(51) Int. Cl.
| | |
|---|---|
| *A01D 34/00* | (2006.01) |
| *A01D 34/66* | (2006.01) |
| *A01D 45/10* | (2006.01) |
| *A01D 34/73* | (2006.01) |
| *A01D 34/78* | (2006.01) |
| *A01D 34/80* | (2006.01) |
| *A01D 63/00* | (2006.01) |

(52) U.S. Cl.
CPC ........... *A01D 34/66* (2013.01); *A01D 34/661* (2013.01); *A01D 34/73* (2013.01); *A01D 34/78* (2013.01); *A01D 34/80* (2013.01); *A01D 45/10* (2013.01); *A01D 63/00* (2013.01)

(58) Field of Classification Search
CPC ......... A01D 45/10; A01D 63/02; A01D 57/22
USPC .................................................. 56/13.6, 13.9
See application file for complete search history.

(56) References Cited

U.S. PATENT DOCUMENTS 2,953,886 A * 9/1960 Errington ............... A01D 45/10
56/13.9
3,325,982 A * 6/1967 Fogels ................... A01D 45/10
56/11.2
(Continued)

FOREIGN PATENT DOCUMENTS

AU   2009212910 A1 *  3/2010  ............. C13B 45/00
BR      8801206 U2 *  8/2009  ............. C13H 3/00
(Continued)

*Primary Examiner* — Árpád Fábián-Kovács
(74) *Attorney, Agent, or Firm* — Peter K. Zacharias; Patrick M. Sheldrake

(57) ABSTRACT

A cutting system for a harvester, the cutting system including a knockdown roller, at least two row dividers, at least two base cutting elements, and at least two inner base cutting discs. Each of the at least two base cutting elements is disposed in the structure of a respective one of the at least two row dividers. Each of the at least two inner base cutting discs is disposed behind the knockdown roller. The cutting system further includes two arms and a lifter roller. Each of the two base cutting elements is connected to a respective one of the two row dividers by a respective one of the two arms. Each of the two base cutting elements is positioned entirely forward of the knockdown roller and the lifter roller.

23 Claims, 2 Drawing Sheets

(56) References Cited

U.S. PATENT DOCUMENTS

| | | | |
|---|---|---|---|
| 3,673,774 A * | 7/1972 | Mizzi | A01D 45/10 56/13.3 |
| 3,791,114 A * | 2/1974 | Fowler | A01D 45/10 56/13.9 |
| 3,848,399 A * | 11/1974 | Makeham | A01D 45/10 56/13.9 |
| 3,919,830 A * | 11/1975 | Gerber | A01D 43/082 56/119 |
| 3,945,177 A * | 3/1976 | Scott | A01D 45/10 56/12.7 |
| 4,019,308 A * | 4/1977 | Quick | A01D 45/10 56/13.9 |
| 4,035,996 A | 7/1977 | Fernandez et al. | |
| 4,070,809 A * | 1/1978 | Soulat | A01D 45/10 56/13.9 |
| 4,098,060 A * | 7/1978 | Quick | A01D 45/10 56/13.9 |
| 4,154,047 A * | 5/1979 | Quick | A01D 45/10 56/13.9 |
| 4,165,596 A | 8/1979 | Duncan | |
| 4,170,098 A * | 10/1979 | Moreno | A01D 45/10 56/13.4 |
| 4,232,719 A * | 11/1980 | Payton | A01G 23/093 144/337 |
| 4,270,337 A | 6/1981 | Pinto | |
| 4,343,140 A * | 8/1982 | Hegger | A01D 45/10 56/10.4 |
| 4,470,244 A | 9/1984 | Leigers | |
| 4,483,129 A * | 11/1984 | Lester | A01D 45/10 56/11.9 |
| 4,722,174 A | 2/1988 | Landry et al. | |
| 5,303,533 A | 4/1994 | Caillouet | |
| 5,463,856 A * | 11/1995 | Beckwith | A01D 45/10 460/134 |
| 5,485,716 A | 1/1996 | Baker | |
| 5,816,036 A | 10/1998 | Caillouet | |
| 5,953,891 A * | 9/1999 | Leigers | A01D 45/10 460/99 |
| 6,062,009 A * | 5/2000 | Caillouet | A01D 45/10 460/100 |
| 6,230,477 B1 | 5/2001 | Caillouet | |
| 6,272,820 B1 * | 8/2001 | Otten | A01D 45/10 56/13.9 |
| 8,117,811 B1 * | 2/2012 | Hall | A01D 43/08 56/157 |
| 8,984,850 B2 * | 3/2015 | Lawson | A01D 45/003 56/13.9 |
| 2012/0110969 A1 * | 5/2012 | Hinds | A01D 47/00 56/63 |
| 2013/0116894 A1 * | 5/2013 | Perez-Iturbe | A01D 45/10 701/50 |
| 2014/0165522 A1 * | 6/2014 | Braunbeck | A01D 45/10 56/10.6 |
| 2014/0352272 A1 * | 12/2014 | Parker | A01D 45/10 56/13.6 |
| 2015/0359177 A1 * | 12/2015 | Richard | A01D 45/10 56/14.7 |

FOREIGN PATENT DOCUMENTS

| | | | |
|---|---|---|---|
| BR | PI0901295-8 A2 | 1/2011 | |
| BR | PI1003959 A2 | 12/2011 | |
| CN | 2605737 Y | 3/2004 | |
| CN | 201733619 U * | 2/2011 | A01D 45/10 |
| CN | 201830668 U | 5/2011 | |
| CN | 201846616 U | 6/2011 | |
| JP | 2000102314 A * | 4/2000 | A01D 45/10 |
| JP | 2009077695 A * | 4/2009 | A01D 45/10 |
| WO | 8501182 A1 | 3/1985 | |
| WO | WO 2012071606 A1 * | 6/2012 | A01D 45/10 |
| WO | WO 2013003925 A2 * | 1/2013 | A01D 45/10 |
| WO | 2014026255 A1 | 2/2014 | |

* cited by examiner

CUTTING SYSTEM FOR A HARVESTER AND A SUGAR CANE HARVESTER HAVING A CUTTING SYSTEM

FIELD OF THE INVENTION

This invention relates to harvesting machines. More particularly, this invention relates to harvesting machines capable of harvesting more than one crop row.

DESCRIPTION OF THE PRIOR ART

Sugarcane harvesting machines are known in the art which are capable of performing a base cut (close to the bottom) and only harvest one crop row, as illustrated in FIG. 1. Basically, these machines include: (i) wheels or tracks 100 for locomotion; (ii) two row dividers 110 located on the front thereof to function as a means to separate the row that will be harvested from the others; (iii) a knockdown roller 120 responsible for knocking down the sugar-canes and in this way, applying tension to its base to make it easy to cut; (iv) pre-cut lifter roller 130; and (v) two cutting discs 140 comprising a plurality of cutting knives for cutting the base of the sugarcanes. After passing through the devices mentioned above, the sugarcanes are collected, chopped and discharged in a storage vehicle (transshipment). However, the machines described above do not support harvesting of more than one crop row.

In an attempt to solve this problem, chopping machines of the same configuration as shown in FIG. 1 were developed, however they comprise cutting discs spaced further apart, enabling harvesting of up to two rows of relatively close plantings. Nevertheless, the distances between the cutting discs and consequently between the crop rows to be harvested are limited to the spacing between the wheels or tracks of the machine.

Still, the existence of adaptive cutting devices are known which are adapted to the side of the harvesting machine as disclosed in document PI0901295-8. Such devices comprise a cutting disc and enable cutting of one row adjacent to the row harvested by the machine. Although you can cut more than one row of planting, to use this device the harvest can only be performed on one row at a time.

OBJECTIVES OF THE INVENTION

In view of the above, the objective of this invention is to provide a system for harvesting machines which makes it possible to cut more than one crop row simultaneously, and optionally to allow for a good adjustment of the cutting height.

This invention also has for its objective the provision of a harvesting machine comprising such a system.

SUMMARIZED DESCRIPTION OF THE INVENTION

In order to achieve the objectives described above, this invention provides a cutting system for harvesting machines, comprising at least two row dividers and at least two cutting elements, each of the at least two cutting elements being positioned in the structure of each of the at least two row dividers.

This invention further provides for a harvesting machine comprising the system mentioned above.

DESCRIPTION OF THE FIGURES

The other advantages and characteristics of the invention will be better understood through the description of the preferred embodiments, given by way of example and which are not limiting, in which.

DETAILED DESCRIPTION OF THE INVENTION

The following description describes a preferred embodiment of the invention. However, as will be apparent to one skilled in the art, the invention is not limited to this particular embodiment.

Figure 1:
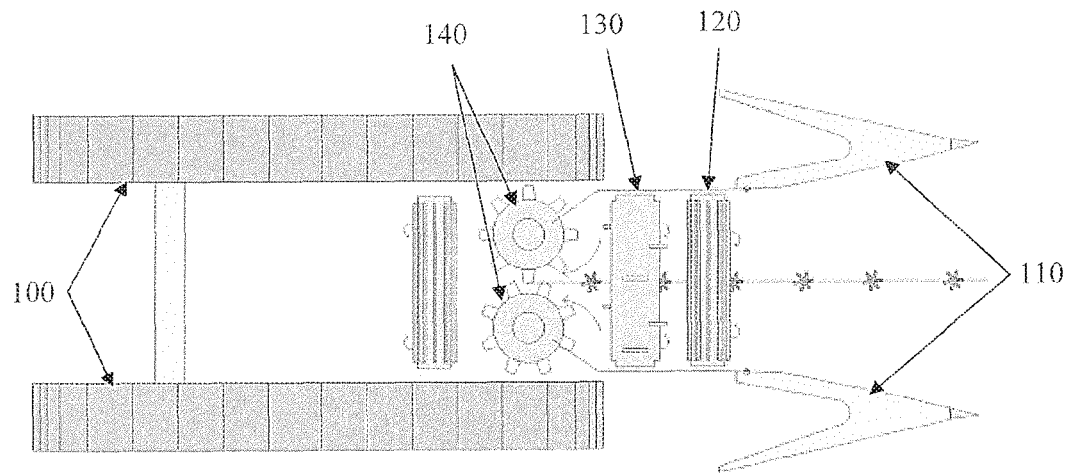
FIG. 1 shows a schematic top view of a harvesting machine for only one crop row as known in the prior art.
Figure 2:
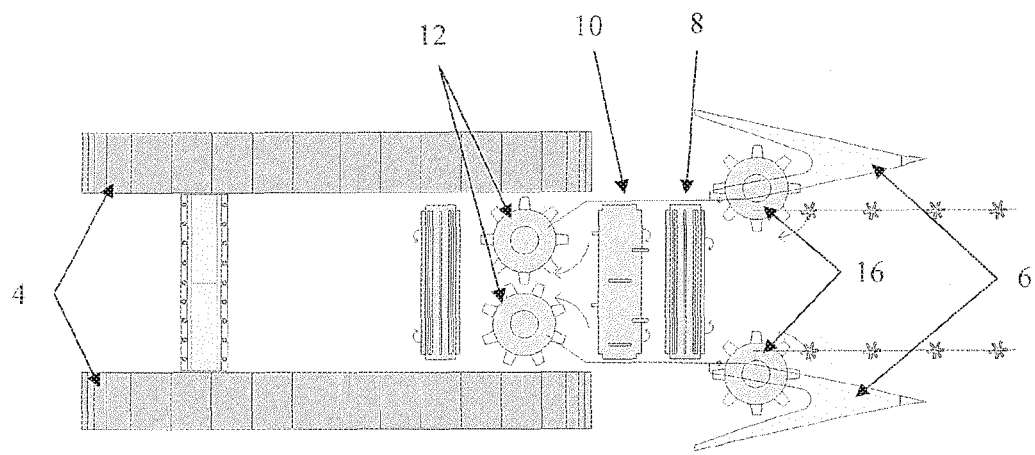
FIG. 2 shows a schematic top view of a harvesting machine for more than one crop row in accordance with this invention.

FIG. 2 shows a schematic top view of a harvesting machine according to this invention comprising, in addition to the basic components of a harvesting machine of the prior art, namely wheels or tracks 4, knockdown roller 8, lifter roller 10, and two internal cutting discs 12, a cutting system (FIGS. 3*a* and 3*b*), also in accordance with this invention, it is provided with row dividers 6 and cutting elements 16. The system is positioned in front of the harvesting machine so that the cutting elements 16 are able to be at a greater distance from each other and are not limited to the spacing between the wheels or tracks 4 thereof. The distance between the cutting elements 16 should preferably be equal to the distance between the crop rows. Preferably, the cutting elements 16 are located forward of the knockdown rollers 8 and the lifter 10. In yet another preferential manner, each of the cutting elements 16 is located forward and outward of the two inner cutting discs 12, as illustrated in FIG. 2.

The cutting elements 16 of this system, as well as the cutting discs from harvesters from the prior art may comprise knives 18. By rotating the cutting elements 16, these knives 18 will perform base cutting of the sugarcane (or any other type of plant you wish to harvest).

Preferably, the cutting elements 16 of the system according to this invention are powered by hydraulic motors which can be powered by the main hydraulic circuit of the harvester. Alternatively, the cutting elements can be powered by electric motors. Thus, it is unnecessary to adjust the hydraulic circuit existing in the original harvester machine, since the engine may be operated, for example, by at least one battery.

Figures 3A, 3B:
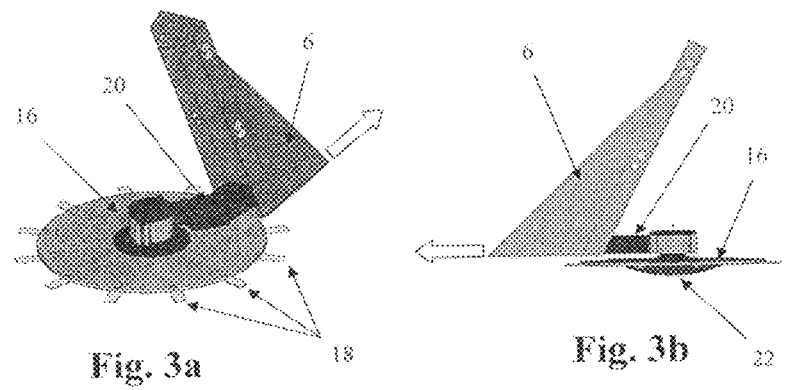
FIGS. 3*a* and 3*b* show details of the cutting device according to this invention connected to a row divider.

In this cutting system, the cutting elements 16 are attached to the structure of the row dividers 6, as illustrated in FIGS. 3*a* and 3*b*. The joint between each of the cutting elements 16 to a row divider 6 may be performed by at least one arm 20. Each of the arms 20 corresponding to each of the of the cutting elements 16 may be attached to each of the row dividers by any known fasteners, such as screws, bolts, rivets, welds, among others.

Optionally, the device according to this invention comprises a height system which may be adjusted depending upon level of the ground. This characteristic is very useful in fields where there is a gap between the crop rows or height variations along the rows. In a first embodiment, the height adjustment system can be independent on each of the arms 20, where each would be articulated with respect to the row divider 6 at the contact point between them (FIGS. 3a and 3b). In other words, such a system would allow pivotal movement of each of the structures 20 with respect to its point of attachment to the structure of the row dividers 6.

Alternatively, each arm 20 can be connected to the structure of each of the row dividers 6 so that the first one has a vertical translation movement with respect to the last one, making a variation possible in the height of the cutting element 16 with respect to the ground.

So that the above variation may be performed, that is, so that it can perform a "read" of the level of the ground and make compensations throughout the harvesting process, a surface 22 (FIG. 3b) at the bottom of each of the cutting elements 16 may be supported and in permanent contact with the ground, making the height adjustment systems mentioned above fit (independently of one another) at the level of the ground at a certain location in the crop rows. Alternatively, the cutting device in accordance with this invention may comprise at least one wheel (not shown) located under each of the cutting elements 16, supported and in contact with the ground, replacing the aforementioned surface 22.

Alternatively or additionally, the structure of each of the divider rows 6 may comprise a suspension system, making it possible for each of them to move vertically to compensate for variations in the terrain. This movement would be carried out independently in each of the referenced assemblies. Such a feature would be possible using, for example, a joint (FIG. 4) or a rail (not shown) at the junction of the structure of each of the row dividers 6 with the chassis of the harvesting machine. This joint or rail may be powered by a hydraulic piston, causing each of the row dividers 6 to move, and consequently adjusting the distance of the element(s) attached thereto with respect to the ground. Optionally, each of the row dividers 6 may comprise wheels located on their underside and supported on the ground to self-adjust to the same height depending on the ground level. Thus, efficient movement may be carried out independently on each row divider 6, compensating for variations in the ground level of each crop row.

Additionally, the cutting device may comprise at least one aligning element (not shown) positioned above each of the cutting elements 16. The aligning elements may be rotary arms parallel to the existing rollers, able to align the cut cane immediately after cutting, facilitating its entry into the feeder of the harvesting machine (knockdown roller 8). This prevents, for example, cane pieces that have already been cut from being collected by the harvesting machine and laid across the row dividers 6. Preferably, each element aligner is connected laterally to the structure of each row divider 6. Optionally, each of the aligning elements is powered by a hydraulic motor, for example, the cutting elements 16.

Figure 4:
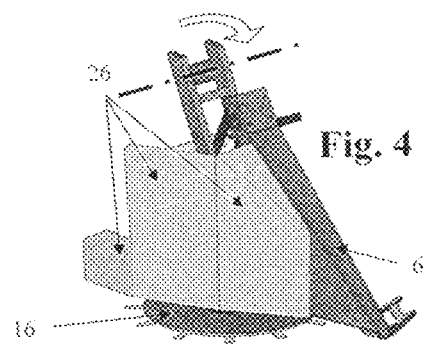
FIG. 4 shows a view of the system according to this invention wherein plates are used on the inner side of a row divider.

Although optional, this invention may comprise plates 26 located on the inner side of the row dividers 6, as shown in FIG. 4. These contribute to "sealing" the inner sides of the row dividers 6, with the double function of aligning the cane better for cutting and preventing the pieces already cut from getting stuck in the structure of the row dividers or the chassis close to that point.

Accordingly, and as illustrated in FIG. 2, the cutting system according to the invention may be adapted to a conventional single crop row harvesting machine, allowing for more than one crop row to be cut and harvested by the original feeding system of the machine, without needing to make adaptations thereto. In this situation, significant modifications would not be necessary in the original harvesting machine. Once again, in reference to FIG. 2, in the situation of the illustrated harvest, i.e., two crop rows, the internal cutting discs 12 may be kept in operation and would function in aiding to feed the cut stems into the machine, no longer performing the base cutting as done previously.

Figure 5:
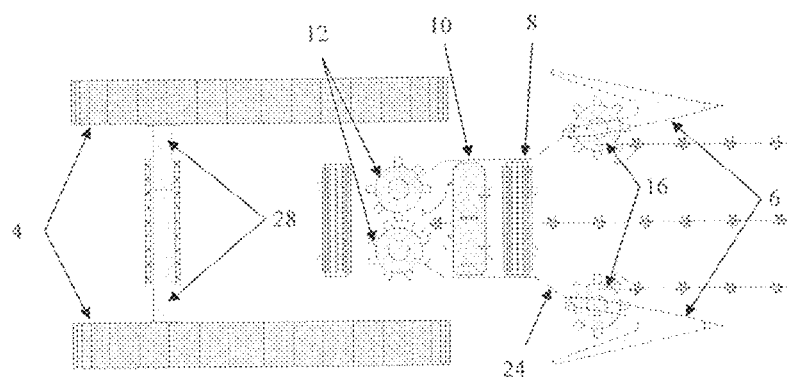
FIG. 5 shows a schematic top view of the harvesting machine according to this invention harvesting three crop rows.

Alternatively, a harvesting machine comprising the device according to the invention could perform the cutting and harvesting of more than two crop rows, as illustrated in FIG. 5. In this configuration, two cutting elements 16 of this cutting system would perform the cutting of two side crop rows, while the internal cutting discs 12 may perform a center line cut, thereby cutting and harvesting three crop rows simultaneously. This could be done, for example, by installing an adaptation structure 24 between the row dividers 6 and the original machine chassis, causing the system to adapt to the spacing between the rows.

In addition, a harvesting machine according to this invention may have the gauge of the wheels or tracks 4 adjusted to adapt to the spacing of the crop rows, to not trample the harvested and adjacent rows. To this end, this harvesting machine may comprise a system for adjusting the size of the axle which connects the wheels or tracks, so that the distance therebetween may be adjusted according to the spacing between the crop rows to be harvested avoiding the problems mentioned above. The adjustment system may comprise, for example, adapters 28 installed on each side of said axle, increasing its effective length.

Numerous variations focusing on the scope of protection of this application are allowed. For example, nothing prevents more than one cutting element is positioned in a single row divider. Thus, it reinforces the fact that this invention is not limited to the particular configurations/embodiments described above.

The invention claimed is:

1. A cutting system for a harvesting machine, the cutting system comprising:
    a knockdown roller;
    two row dividers, each comprising a structure;
    two forward base cutting elements, each of the two forward base cutting elements positioned in the structure of a respective one of the two row dividers, each of the two forward base cutting elements comprising one or more knives disposed entirely forward of the knockdown roller such that the one or more knives of each of the two forward base cutting elements are entirely forward of the knockdown roller at all times during rotation of the one or more knives of each of the two forward base cutting elements; and
    two inner base cutting elements disposed behind the knockdown roller.

2. The cutting system of claim 1, further comprising two arms, wherein each of the two forward base cutting elements is connected to a respective one of the two row dividers by a respective one of the two arms.

3. The cutting system of claim 1 or 2, further comprising a lifter roller, wherein the one or more knives of each of the two forward base cutting elements are positioned entirely in front of the knockdown roller and the lifter roller such that the one or more knives of each of the two forward base cutting elements are entirely forward of the knockdown roller and the lifter roller at all times during rotation of the one or more knives of each of the two forward base cutting elements.

4. The cutting system of claim 2, wherein each of the two arms is jointed with relation to the respective one of the two row dividers.

5. The cutting system of claim 2, wherein each of the two arms is configured for vertical translation movement with regard to the respective one of the two row dividers.

6. The cutting system of claim 1, 2, 4, or 5, wherein the two forward base cutting elements are located forward and outward of the two inner base cutting elements.

7. The cutting system of claim 1, 2, 4, or 5, further comprising at least two aligning elements.

8. The cutting system of claim 1, further comprising at least two aligning elements, each connected to a respective one of the two row dividers.

9. A harvesting machine comprising the cutting system of claim 1.

10. The harvesting machine of claim 9, wherein the harvesting machine is a sugar cane harvesting machine.

11. A cutting system for a harvesting machine, the cutting system comprising:
 a knockdown roller;
 two row dividers, each comprising a structure;
 two forward base cutting elements, each of the two forward base cutting elements positioned in the structure of a respective one of the two row dividers, each of the two forward base cutting elements having a center of rotation; and
 two inner base cutting elements disposed behind the knockdown roller,
 wherein the two forward base cutting elements are positioned so that their centers of rotation are forward of the knockdown roller.

12. The cutting system of claim 11, further comprising two arms, wherein each of the two forward base cutting elements is connected to a respective one of the two row dividers by a respective one of the two arms.

13. The cutting system of claim 12, wherein each of the two arms is jointed with relation to the respective one of the two row dividers.

14. The cutting system of claim 12, wherein each of the two arms is configured for vertical translation movement with regard to the respective one of the two row dividers.

15. The cutting system of claim 11, further comprising a lifter roller, wherein the two forward base cutting elements are positioned so that their centers of rotation are forward of the knockdown roller and the lifter roller.

16. The cutting system of claim 11, further comprising a lifter roller, wherein each of the two inner base cutting elements has a center of rotation, wherein the two forward base cutting elements are positioned so that their centers of rotation are forward of the knockdown roller and the lifter roller, and wherein the two inner base cutting elements are positioned so that their centers of rotation are behind the knockdown roller and the lifter roller.

17. The cutting system of claim 11, wherein each of the two inner base cutting elements has a center of rotation, and wherein the two inner base cutting elements are positioned so that their centers of rotation are behind the knockdown roller.

18. The cutting system of claim 17, wherein the two forward base cutting elements are located forward and outward of the two inner base cutting elements.

19. A cutting system for a harvesting machine, the cutting system comprising:
 a knockdown roller;
 two row dividers, each comprising a structure;
 two forward base cutting elements, each of the two forward base cutting elements positioned in the structure of a respective one of the two row dividers, each of the two forward base cutting elements having a center of rotation; and
 two inner base cutting elements, each of the two inner base cutting elements having a center of rotation,
 wherein the two forward base cutting elements are positioned so that their centers of rotation are forward of the knockdown roller, and
 wherein the two inner base cutting elements are positioned so that their centers of rotation are behind the knockdown roller.

20. The cutting system of claim 19, further comprising two arms, wherein each of the two forward base cutting elements is connected to a respective one of the two row dividers by a respective one of the two arms.

21. The cutting system of claim 20, wherein each of the two arms is jointed with relation to the respective one of the two row dividers.

22. The cutting system of claim 19, further comprising a lifter roller, wherein the two forward base cutting elements are positioned so that their centers of rotation are forward of the knockdown roller and the lifter roller, and the two inner base cutting elements are positioned so that their centers of rotation are behind the knockdown roller and the lifter roller.

23. The cutting system of claim 19, wherein the two forward base cutting elements are located forward and outward of the two inner base cutting elements.

* * * * *